No. 657,945. Patented Sept. 18, 1900.
C. W. LEVALLEY.
CHAIN.
(Application filed Dec. 27, 1897.)
(No Model.)
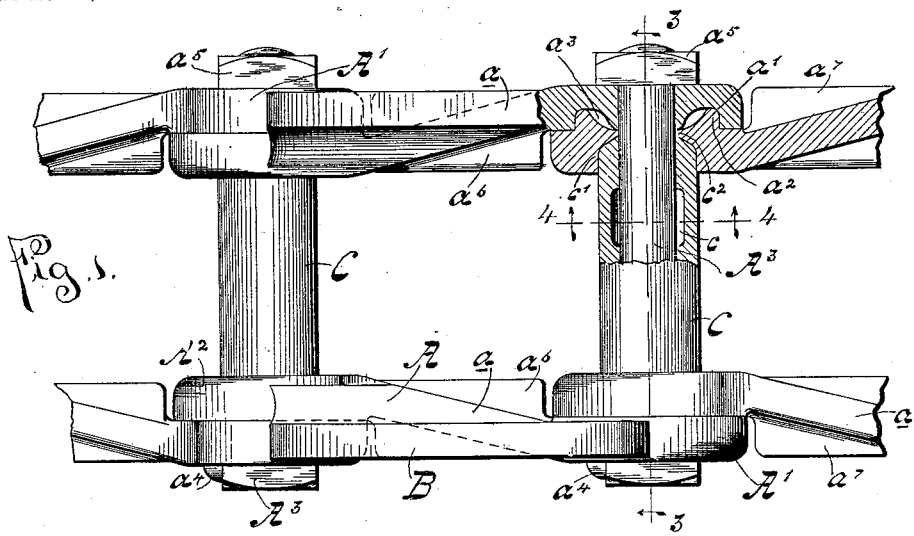
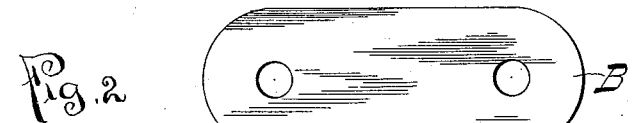
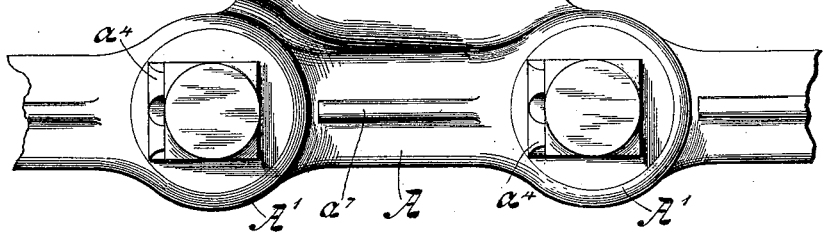
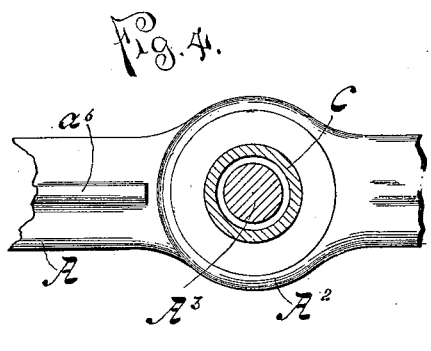
Witnesses.
Inventor.
Christopher W. Levalley.

UNITED STATES PATENT OFFICE.

CHRISTOPHER W. LEVALLEY, OF MILWAUKEE, WISCONSIN.

CHAIN.

SPECIFICATION forming part of Letters Patent No. 657,945, dated September 18, 1900.

Application filed December 27, 1897. Serial No. 663,621. (No model.)

*To all whom it may concern:*

Be it known that I, CHRISTOPHER W. LEVALLEY, a citizen of the United States, residing at Milwaukee, in the county of Milwaukee and State of Wisconsin, have invented certain new and useful Improvements in Chains and Chain-Links, of which the following is a specification.

My invention relates to that type of chains wherein independent side bars are coupled together in pairs and to the next succeeding pair by bolts passing through the knuckling point from side to side and are spaced by shoulders on said bolts or by barrels or sleeves encircling the bolts and free to turn thereon; and the invention consists in forming one end of each side bar with an annular lateral recess and the other end with an annular lateral flange adapted to interlock with and turn in the recess of the next adjacent link, whereby longitudinal strain upon the links is taken up by the flange, practically relieving the bolt; in so shaping the inner walls of said recess and flange as to afford an annular chamber between the two for the reception of lubricant; in combining with the uniting-bolt and with the side bars a spacing-sleeve encircling said bolt and free to turn thereon and annular sockets surrounding the bolt-holes through the inner pair of side bars at each joint, which receive the ends of said barrels and act as bearings therefor, thereby materially taking the thrust of the sprockets off of the bolt and shielding the joint from dirt; in providing the sleeve or barrel with internal chambers for lubricant, and in the various other combinations and details of construction hereinafter pointed out and claimed.

In the drawings, Figure 1 is a top plan view, partly in section, of a fractional length of chain embodying my invention. Fig. 2 is a side elevation thereof. Fig. 3 is a transverse section on the correspondingly-numbered line in the first figure, the cross-bolt being omitted; and Fig. 4, a section on line 4 4 of said first figure.

A represents the side bars of the chain. These are formed with an inwardly-bending body portion $a$ and discoid ends $A'$ $A^2$, arranged in parallel planes lengthwise of the chain, the end $A'$ setting out sufficiently far from the plane of the opposite or insetting end to close over and fit against the exterior face of the insetting end of the next adjacent side bar. The outsetting end $A'$ of each side bar is formed with an internal annular recess $a'$, concentric with the bolt-hole $a$ therethrough, while the insetting end $A^2$ of said bar is provided with an external annular flange $a^2$, also concentric with the bolt-hole $a''$ therethrough and as to its periphery adapted to fit snugly into the recess of the next adjacent link and turn therein as in a bearing. The side bars are thus interlocked at the joints, so that the strain of working comes on such interlocking joints, relieving the cross-bolts $A^3$, which unite the bars, to a very great extent from strains, although of course the bolts may help when the strain is very severe.

The inner face of the flange $a'$ and the counter-face of the recess $a^2$ are cupped or hollowed to leave an annular chamber $a^3$ suitable for the reception of a lubricant to supply the interlocking joint and the bolt.

A snug or stop $a^4$ on the outer face of each side bar, adjacent to the bolt-hole through the outsetting end thereof, is arranged to fit against the head of the cross-bolt or one of the facets thereof, thereby keeping the bolt always in place with the side bars, and a nut $a^5$ holds the bolt in place. The inset of the body of the side bars is corrected on the inner faces by flanges $a^6$, which prevent the sprocket from riding upon the butt-end of the innermost bars at each joint, while on the outer faces are reversely-set flanges $a^7$, which act as clearers in the knuckling action to the joints between their successive side bars.

Special wings or flanges B, of various shapes and styles, will be cast or formed on some of the links or side bars for all sorts of purposes, and the side bars will advisably be made interchangeable and replaceable, except as their interchange may be limited by such wings or the necessity to keep one edge uppermost.

The separate side bars of the links are as to their essential features duplicates one of the other, so that they may be interchanged and so that the open spaces between adjacent cross-bolts are of uniform shape and size, and when in this specification the side bars are referred to as being alike or duplicates one of the other it is meant that they are duplicates as to their essential features, whereby when properly brought together they make an operative chain. When so considered, the presence or absence of such parts as the wings B is entirely immaterial.

As thus far described, in the absence of shoulders upon the bolt the side bars would not be held apart or spaced. Instead of such shoulders it has been customary in the type of chains hereinbefore referred to to use a sleeve or barrel encircling the bolt and turning thereon by contact with the sprockets, so that it rides on and off of the sprockets easily, and wear is distributed. Such a sleeve or barrel I prefer to use and have shown in the drawings, wherein C represents the sleeve or barrel and $c$ chambers or recesses formed in the bore of the barrel to hold a supply of lubricants or to receive oil. The ends of the barrel go into annular sockets $c'$, surrounding the bolt-holes, through the insetting ends of the side bars and are free to turn therein, but space the side bars apart by their abutment against the webs or partitions $c^2$, forming the bottom of these sockets. The main function of the sockets is to keep dirt out of the joints and off of the bolt to protect them from undue wear. They also relieve the bolt from the lateral thrust of the barrel as the latter engages with the sprockets and transmit it to the interlocking joints of the side bars. With this construction the cross-bolts simply hold the side bars and barrels in place and leave them properly positioned for free movement with little or no strain upon the bolt either longitudinally or laterally. The barrels are free to turn in their sockets and the interlocked side bars free to work upon each other. The strain of the barrels comes directly upon the sockets in the side bars and not upon the cross-bolts, and thence it goes to the annular recesses and interlocking flanges.

I claim—

1. A drive-chain comprising independent side bars which are duplicates one of the other, such side bars having their opposite end portions arranged in parallel planes lengthwise of the chain, one end being set in and the other end set out, whereby the end portions of the side bars of adjacent links are arranged to lie side by side, the contiguous faces of such end portions of the side bars being provided with interlocking annular flanges and recesses concentric with holes formed in the said end portions of the side bars, cross-bolts passing through such holes and uniting the side bars, and means for maintaining the side bars of each link properly separated under working conditions and holding the interlocking flanges and recesses in engagement, substantially as set forth.

2. A chain comprising independent side bars, cross-bolts uniting them, the links having end portions arranged in parallel planes lengthwise of the chain, one end portion of each side bar being set in and the other set out, and the said end portions being connected by inclined central or body portions of the bar, and these inclined central portions being provided with reversely-set flanges or webs, and the contiguous faces of the end portions of the side bars being provided with interlocking annular flanges and recesses concentric with the holes for the cross-bolts through the said end portions of the side bars, and means for maintaining the side bars of the links properly separated under working conditions and with the interlocking flanges and recesses in engagement, substantially as set forth.

3. The combination with the side bars having annular lateral recesses and flanges concentric with the bolt-holes therethrough and having bearing-sockets at one end in their inner faces around said bolt-holes, of the cross-bolts uniting said side bars and the barrels encircling the cross-bolts and entering at their ends into said sockets and turning therein.

4. A drive-chain comprising side bars having discoid end portions, connecting cross-bolts passing through holes in the said discoid end portions of the said side bars, the said end portions being arranged in planes substantially parallel with a line corresponding with the length of the chain, and one end of each bar being set in and the other end set out, and such end portions being connected by inclined central or body parts of the side bars, and the latter being provided with reversely-set side webs or flanges, means for maintaining the side bars properly separated under working conditions, substantially as set forth.

CHRISTOPHER W. LEVALLEY.

Witnesses:
WILLIAM C. FRYE,
VLASTA I. KLOFANDA.